T. MOWER.
COOKING VESSEL.
APPLICATION FILED AUG. 4, 1909.

944,244.

Patented Dec. 21, 1909.

Witnesses:
Wm. Geiger
H. W. Munday.

Inventor:
Theresa Mower
By Munday, Evarts, Adcock & Clarke.
Attorneys

UNITED STATES PATENT OFFICE.

THERESA MOWER, OF CHICAGO, ILLINOIS, ASSIGNOR TO THERESA MOWER AND CLARA WILLIAMS, OF CHICAGO, ILLINOIS.

COOKING VESSEL.

944,244.

Specification of Letters Patent. Patented Dec. 21, 1909.

Application filed August 4, 1909. Serial No. 511,095.

*To all whom it may concern:*

Be it known that I, THERESA MOWER, a citizen of the United States, residing in Chicago, in the county of Cook and State of Illinois, have invented a new and useful Improvement in Cooking Vessels, of which the following is a specification.

This invention is an improvement in cooking vessels, adapted to be drained of its fluid contents while hot and with less danger to the cook than is possible with vessels of the ordinary construction.

The nature of my improvement is disclosed in the description thereof given below, and it is also illustrated in the accompanying drawing, in which—

Figure 1:
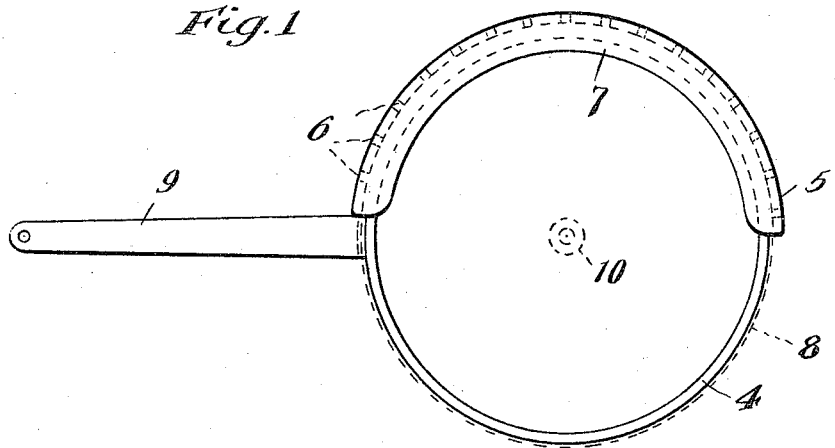
Figure 2:
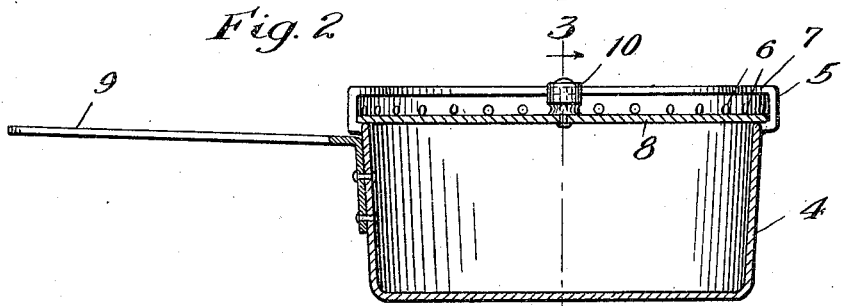

Figure 1 is a plan view. Fig. 2 is a vertical section, and Fig. 3 a section on the line 3—3 of Fig. 2, showing the vessel in position for draining.

Figure 3:
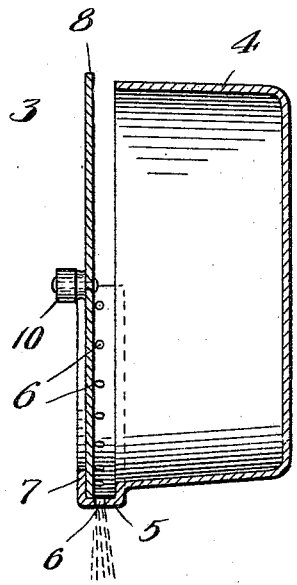

In said drawing 4 represents an ordinary pot or pan adapted to hold fluids, and adapted to be used in heating fluids or in cooking food. It differs however from the common construction of such vessels in having at its top an upstanding draining rim 5 extending around the circumference. This rim is offset from the body of the vessel but otherwise conforms thereto, and is perforated as at 6 so that fluids can pass through it, and it is also provided with an inward extending flange 7 which serves as a retainer to the lid 8. In other words this retainer serves as its name implies, to prevent the lid from slipping off or out of place when the vessel is tipped to drain off its fluid contents, as is shown at Fig. 3. The lid is preferably unattached to the vessel, but the flanged rim will keep it in place when needed with ordinary usage. Being unattached, the lid settles down upon the vessel when the latter is on the stove and closes the top entirely, thereby rendering the vessel steam tight, and at the same time when the vessel is tipped as in Fig. 3 the lid is free to shift under the pressure against it of the contents so that the perforations in the rim will be uncovered and allow the escape of the contents as illustrated in said figure.

The vessel is desirably though not necessarily provided with a handle 9 whereby it may be lifted and tipped, and the lid has a button 10 upon its top for convenience in handling it.

I claim:—

1. The cooking vessel having a substantially semi-circular raised rim 5 conforming to the body of the vessel but offset therefrom, such rim being provided with perforations whereby it may be drained, and being high enough to enable it to receive a lid, and having an inwardly extending flange 7 for confining the lid when the vessel is tipped.

2. The cooking vessel having a substantially semi-circular raised rim 5 conforming to the body of the vessel but offset therefrom, such rim being provided with perforations whereby it may be drained, and being high enough to enable it to receive a lid, and having an inwardly extending flange 7 for confining the lid when the vessel is tipped, in combination with a lid acting to close the vessel while the cooking is being done, and to uncover the perforations when the vessel is tipped to drain off its fluid contents.

THERESA MOWER.

Witnesses:
H. M. MUNDAY,
PEARL ABRAMS.